United States Patent [19]
Leach

[11] Patent Number: 5,325,818
[45] Date of Patent: Jul. 5, 1994

[54] SAFETY HARNESS FOR INFANTS AND TODDLERS

[76] Inventor: Jamie S. Leach, 130 E. 10th St., Ada, Okla. 74820

[21] Appl. No.: 101,737

[22] Filed: Aug. 4, 1993

[51] Int. Cl.⁵ ............................ A01K 3/00; A62B 35/00; A63B 69/00
[52] U.S. Cl. ......................................... 119/770; 182/3; 119/792; 119/857; 119/907
[58] Field of Search ............... 119/770, 792, 793, 857, 119/907; 2/102; 182/3, 4; 224/184

[56] References Cited
U.S. PATENT DOCUMENTS

| | | | |
|---|---|---|---|
| 3,088,438 | 5/1963 | Oliphant | 119/770 |
| 4,666,017 | 5/1987 | Zimmerman | 119/770 |
| 4,667,624 | 5/1987 | Smith | 119/770 |
| 4,676,198 | 6/1987 | Murray | 119/907 |
| 4,840,144 | 6/1989 | Voorhees et al. | 119/857 |
| 5,119,767 | 6/1992 | Jimenez | 119/770 |

*Primary Examiner*—Gene Mancene
*Assistant Examiner*—Todd E. Manahan
*Attorney, Agent, or Firm*—William S. Dorman

[57] ABSTRACT

A restraining device or harness for use with a child such as an infant or toddler. In one mode, the harness can be used to restrain the child when the child is ambulatory; in a second mode, the harness can be used as a safety belt for use in grocery carts, high chairs or certain other types of chairs.

7 Claims, 3 Drawing Sheets

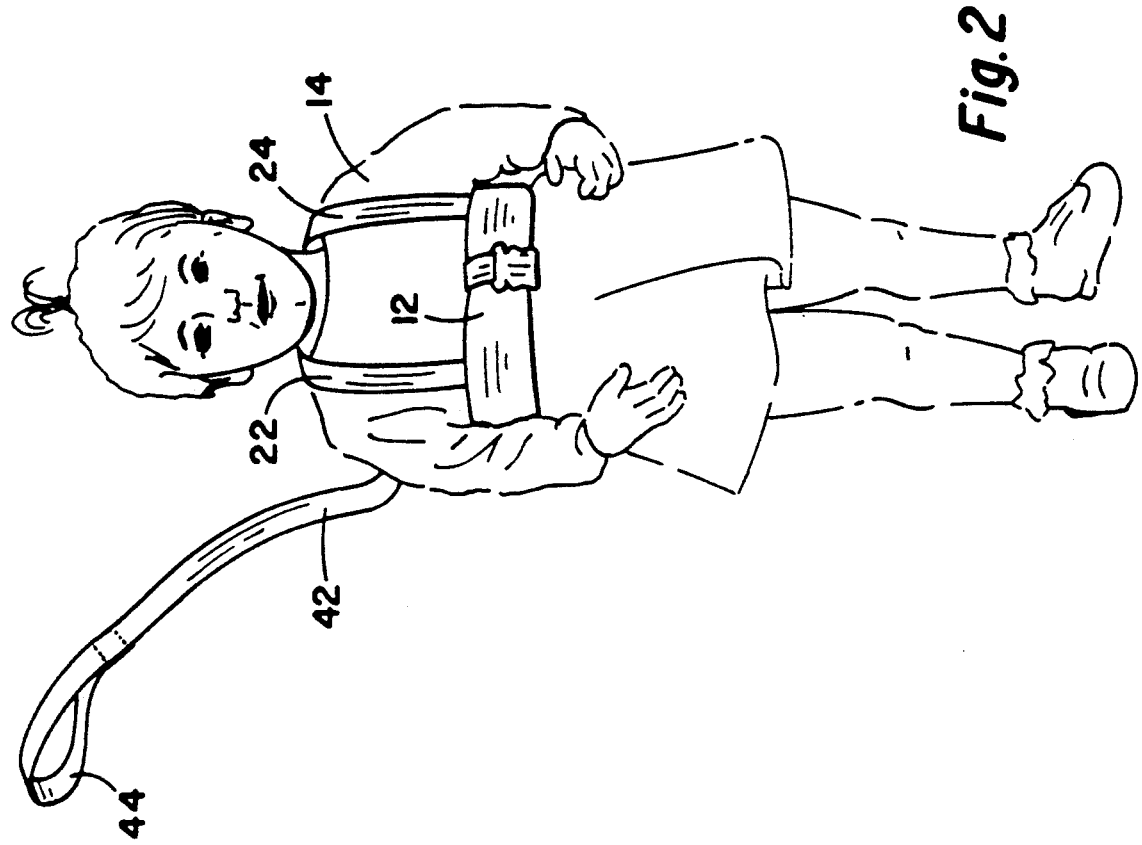
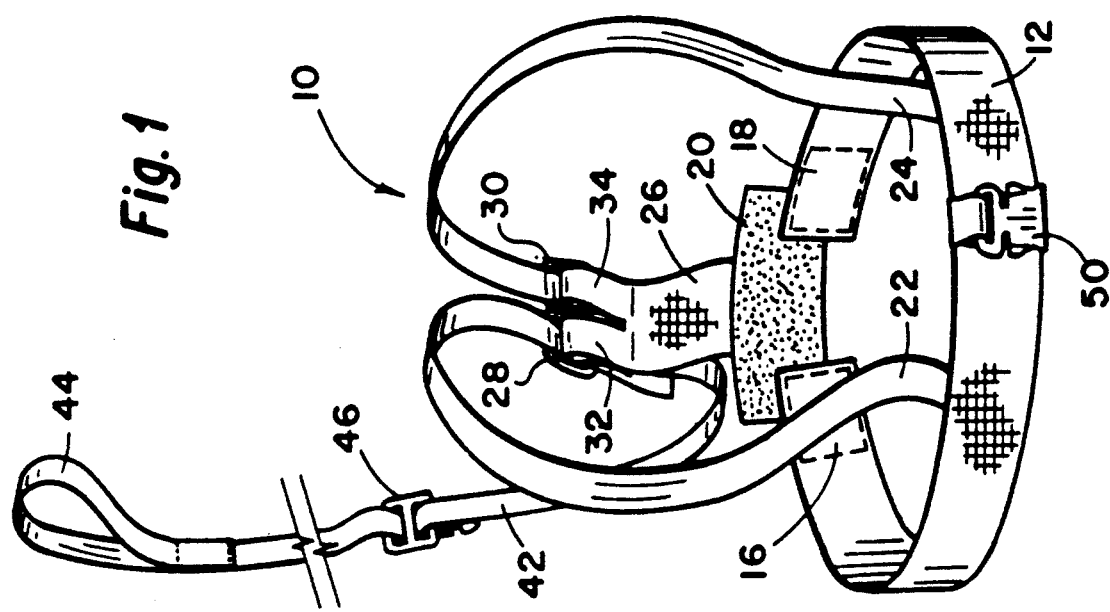

SAFETY HARNESS FOR INFANTS AND TODDLERS

BACKGROUND OF THE INVENTION

1. Field of the Invention

The present invention relates generally to a restraining device or harness for use with a child such as an infant or toddler. More particularly, the present invention relates to a harness which, in one mode, can be used to restrain the child when the child is ambulatory and, in a second mode, can be used as a safety belt for use in grocery carts, high chairs and certain other chairs.

2. The Prior Art

Many belts, harnesses or other devices have been proposed in the past for securing a child or infant securely in a shopping cart or in a high chair or in certain other conventional chairs.

Numerous harnesses have been proposed which would permit the restraining of a child while walking, at the end of a tether.

Prior to the present invention, there has been no satisfactory device or harness which is capable of serving (1) as a restraint for use with a child who is walking and, at the same time, (2) as a means for securing a child in a shopping cart, high chair or other conventional chair.

Of possible interest is Zimmerman U.S. Pat. No. 4,666,017 issued May 19, 1987 on "Infant Harness or the Like". The Zimmerman patent provides a restraining device for use when the child is walking; however, the tether of the Zimmerman patent is attached directly to the waistband. In the present invention the tether is a direct extension of the shoulder straps which allows steering control from the shoulder area. Furthermore, the Zimmerman patent does not provide a safety harness for a high chair or shopping cart.

SUMMARY OF THE INVENTION

The present invention involves a safety harness for a child; in one mode, this harness can be used to restrain and guide the child when the child is walking; in a second mode, the safety harness can be used as a safety belt to lock a child in a grocery cart, high chair and certain other chairs when the child is positioned in a seat of such cart or chair.

The child safety harness includes a waistband which is adapted to encircle the waist of a child. The waistband is provided with two free ends which are preferably positioned adjacent the rear portion of the waist of the child. These free or rear ends of the waistband are provided with rectangular pieces of fastening material of the hook and loop type. A connecting strap is also provided which has a surface of the hook and loop type so that, when the waistband is adjusted to the waist dimension of the child, the connecting strap is placed over the free ends of the waistband with the hook and loop portions intermating to secure the waistband in position.

A fastening strap is connected at its lower end to the connecting strap. The fastening strap has an upper end which divides into two buckle straps. The upper end of each buckle strap is connected to a slide buckle by having the material loop over the central rod of the slide buckle and attach back to itself by stitching or other suitable means.

A pair of shoulder straps connect at their forward ends to a portion of the waistband in spaced relation. These shoulder straps extend over the shoulders of the child and pass through the slide buckles which are mounted on the upper ends of the buckle straps. That is, the lower end of each shoulder strap fits underneath the upper end of one of the buckles, around the folded edge of the buckle strap and downwardly beneath the lower end of the slide buckle. The lower ends of the shoulder straps are connected together below the slide buckles by means of a box stitch.

A tether strap, preferably about three feet in length, has one end attached to the lower connected ends of the two shoulder straps by box stitching which is superimposed over the box stitch which holds the two shoulder straps together. The tether strap is provided with a loop at its outer end so that a parent or adult can put his hand in the loop and restrain the movement of the child, even though the child has ample room for moving about. It should be noted that the tether strap constitutes an extension of the shoulder straps. The slide buckles can be moved upwardly in relation to the shoulder straps to properly engage the upper body of the child.

Intermediate the ends of the tether strap is an adjustable (slidable) locking buckle. The locking buckle is provided with prongs which are adapted to be received in a clasp mounted on the front side of the waistband. When the child is in a shopping cart or grocery cart or certain types of chairs, the tether strap can be inserted underneath the seat behind the child and brought forward beneath the seat until the locking buckle is inserted into the clasp. The position of the clasp can be varied depending upon the physical dimensions of the child and the seat so as to provide a proper locking seatbelt for the child. The clasp is provided with ears which can be squeezed toward each other to release the prongs of the locking buckle in a conventional manner.

BRIEF DESCRIPTION OF THE DRAWINGS

FIG. 1 is a front perspective of the child safety harness of the present invention showing its use in the walking mode, minus the child;

FIG. 2 is a front perspective of the child safety harness shown in FIG. 1 as worn by a child;

DETAILED DESCRIPTION OF THE PREFERRED EMBODIMENT

Figure 4:
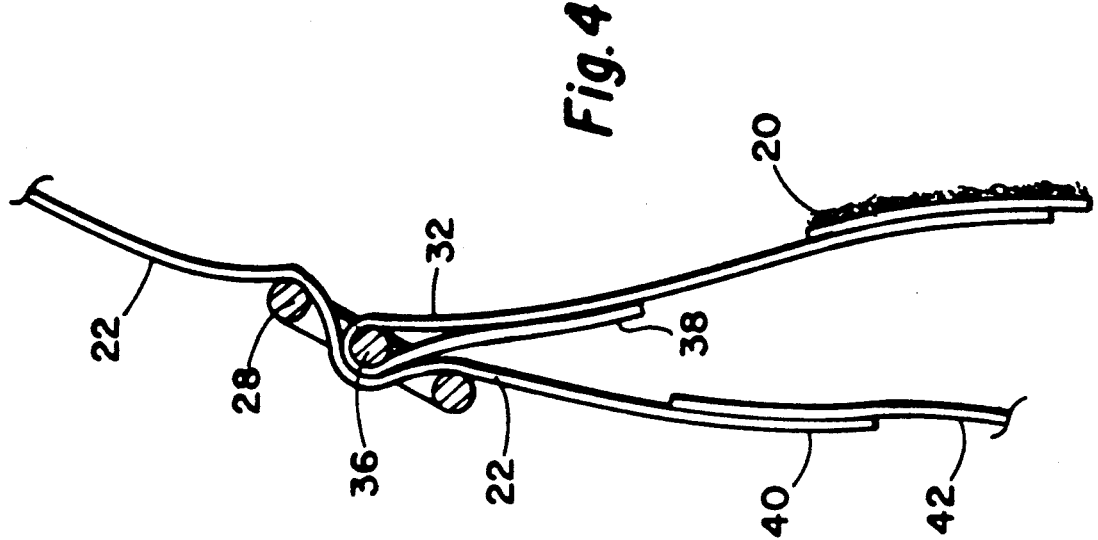
FIG. 4 is a view through one of the slide buckles, taken along section line 4—4 of FIG. 3, showing how the shoulder straps are fitted through the buckles around the upper ends of the buckle straps.

Referring to the drawings in detail, FIG. 1 shows a safety harness 10 which includes a waistband 12 which is adapted to encircle the waist of a child 14 shown in FIG. 2. The rear ends 16 and 18 of the waistband are provided with rectangular pieces of fastening material of the hook and loop type for a purpose which will hereinafter appear. The harness 10 further includes a connecting strap 20 which is also provided with a hook and loop type fastening surface, as shown, on the portion thereof facing the fastening rectangles 16 and 18. The free ends 16 and 18 of the waistband 12 can be brought as close together as required by the waist dimension of the child 14 and the connecting strap 20 is then positioned against the fastening rectangles to secure the waistband snugly around the waist of the child.

A pair of shoulder straps 22 and 24 connect at their forward ends to the front portion of the waistband in spaced relation as shown in FIG. 1. The shoulder straps extend over the shoulders of the child 14 as shown in FIG. 2 and connect with a fastening strap 26 by means of a pair of slide buckles 28 and 30 in a manner later to be described. The fastening strap 26 has a lower end which physically attaches to the rear portion of the waistband; more particularly, the lower end of the strap is attached to the connecting strap 20.

Figure 3:
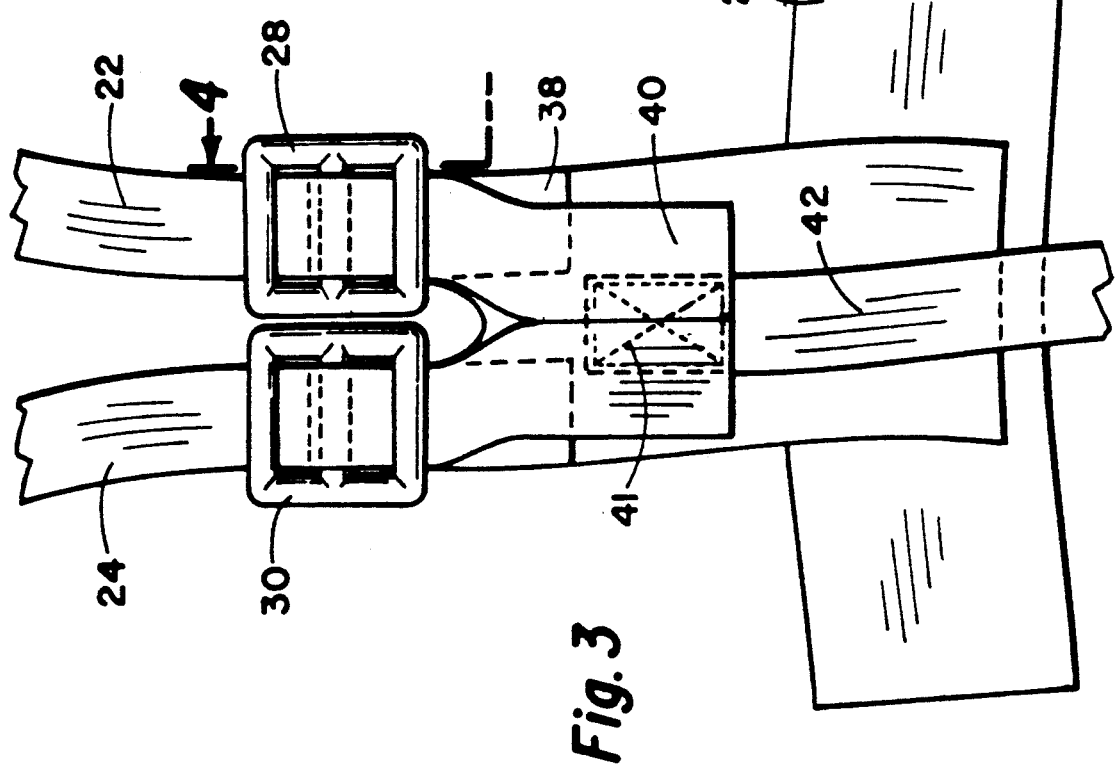
FIG. 3 is a rear view showing how the two shoulder straps come together to form a wide connection to which the tether strap is attached.

The upper end of the fastening strap 26 divides into two buckle straps 32 and 34. As best shown in FIG. 4, buckle strap 32 loops over a central rod 36 in the slide buckle 28 and attaches to itself as at 38 by stitching or other suitable means. The buckle strap 34 attaches to the slide buckle 30 in exactly the same way, although this is not specifically shown in the drawings. The shoulder strap 22 fits underneath the upper end of the buckle 28, around the folded edge of the buckle strap 32 and downwardly beneath the lower end of the slide buckle as shown in FIG. 4. As shown in FIG. 3, the lower ends of the shoulder straps 22 and 24 are connected together to form a double wide strip 40 by means of a box stitch 41. A tether strap 42 has one end attached to the lower end 40 of the two shoulder straps 22 and 24 by box stitching which is superimposed over the box stitch 41.

Figure 5:
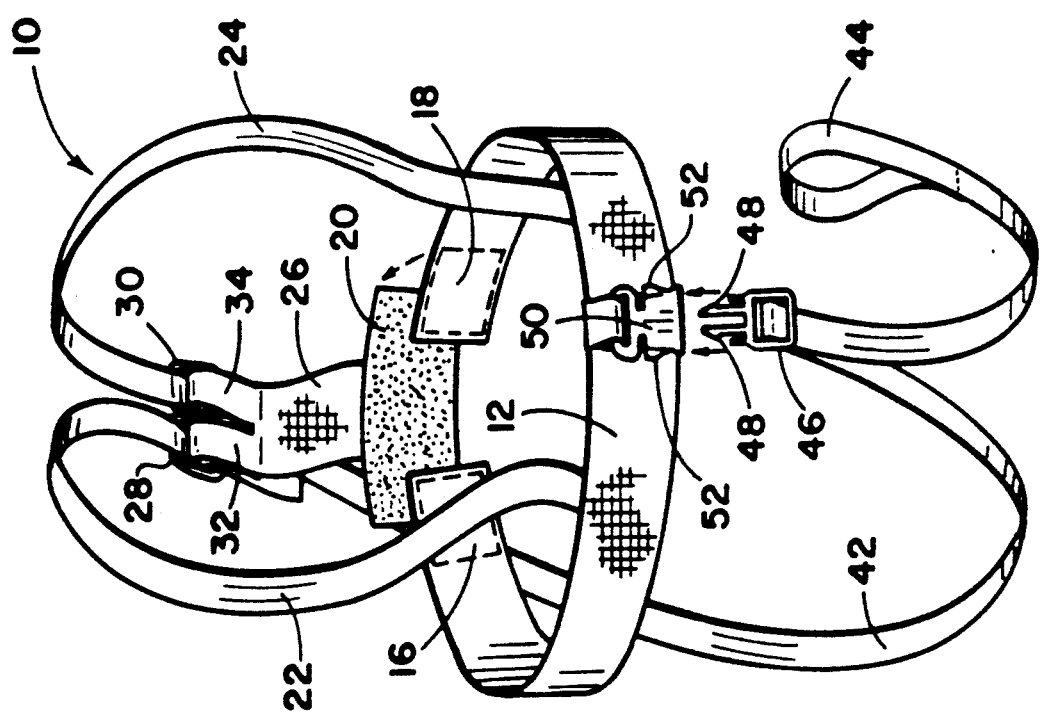
FIG. 5 is a front perspective of the child safety harness of the present invention in a seatbelt mode.

As best shown in FIGS. 1, 2 and 5, the tether strap 42 is elongated and is provided with a loop 44 at its outer end so that a parent or mature person can put his hand in the loop 44 and hold the child in the position shown in FIG. 2. Preferably the tether 42 is at least about three feet long to give the child sufficient room for moving about.

When the waistband 12 is fitted around the waist of a child after the shoulder straps 22 and 24 are positioned over the shoulders of the child, the slide buckles 28 and 30 are adjusted upwardly along the rear portions of the shoulder straps 22 and 24 so as to snugly embrace the child. At this point the tether 42 becomes a direct extension of the shoulder straps 22 and 24 so as to allow a limited amount of steering control for the shoulder area of the child. The stitching arrangement shown in FIG. 3, i.e. the permanent attachment of the tether 42 to the shoulder straps 22 and 24, prevents the slide buckles from ever sliding off the shoulder straps 22 and 24.

Figure 6:
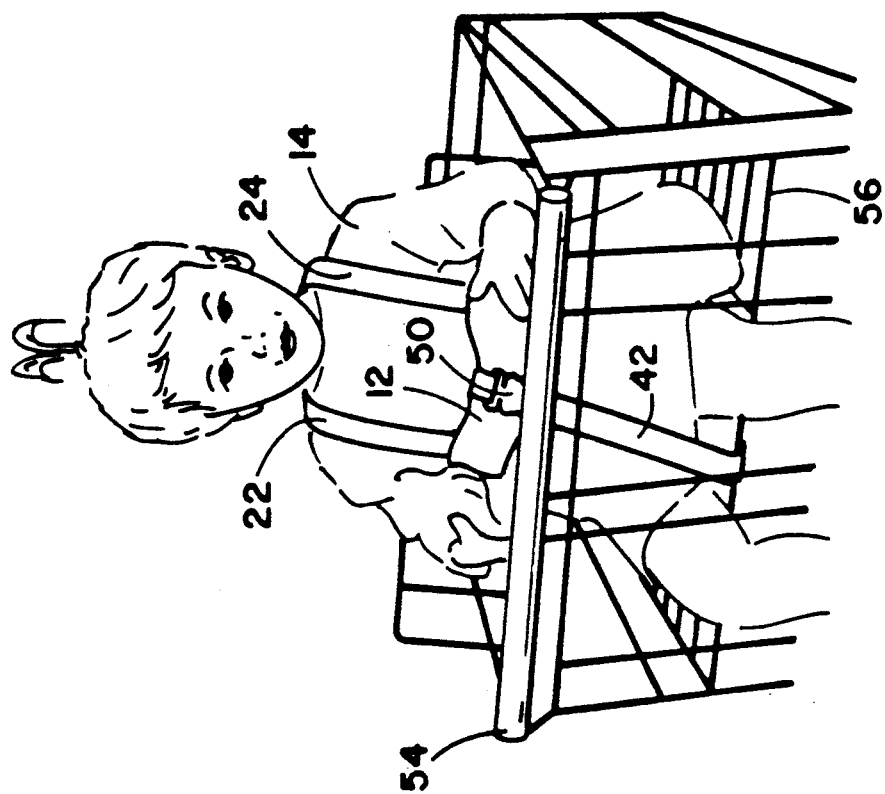
FIG. 6 is a view of the child safety harness shown in FIG. 5 showing a child secured in position in a shopping cart utilizing the safety belt feature of the present invention.

Intermediate the ends of the tether 42 is an adjustable (male) locking buckle 46. As best shown in FIG. 5, the locking buckle 46 is provided with prongs 48 which are adapted to be received in an adjustable (female) clasp 50 mounted on the front side of the waistband 12. The clasp 50 is provided with ears 52 which can be squeezed towards each other to release the prongs 48 in a conventional manner. When the child 14 is in a shopping cart 54 as shown in FIG. 6, the tether 42 can be placed around the seat 56 from the rear, slipped forwardly underneath the seat and the locking buckle 46 inserted into the clasp 50.

Depending upon the size of the child and/or the width of the seat 56, the buckle 46 can slide forward or backward on the tether 42 to provide the amount of restraint needed.

Whereas, the present invention has been described in particular relation to the drawings attached hereto, other and further modifications, apart from those shown or suggested herein, may be made within the spirit and scope of this invention.

What is claimed is:

1. A safety harness for a child comprising a waistband having two free ends which can be brought as close together as required by the waist dimension of the child, means for connecting the free ends of the waistband so that the waistband is snugly received around the waist of the child, the waistband having a front portion which engages the front portion of the waist of the child and a rear portion which engages the rear portion of the waist of the child, a fastening strap having a lower end and an upper end, the lower end of the fastening strap attached to the rear portion of the waistband and extending upwardly therefrom, the upper end of the fastening strap dividing into two buckle straps extending upwardly from the fastening strap, a slide buckle associated with each buckle strap, each slide buckle having an upper end, a lower end and an intermediate central rod, each buckle strap having an upper end which loops over the central rod in a slide buckle and which attaches to itself so as to form a closed loop over the central rod of the slide buckle, a pair of shoulder straps having forward ends and rear ends, the forward ends of the shoulder straps being attached to the front portion of the waistband and extending over the shoulders of the child, the rear ends of the shoulder straps slidably engaging the buckles so that each shoulder strap fits underneath the upper end of its associated buckle, over the looped end of the associated buckle strap and downwardly beneath the upper end of the slide buckle, the rear ends of the shoulder straps being connected together below the buckles, an elongated tether strap having a forward end and a rear end, the forward end of the tether strap being attached to the rear ends of the shoulder straps where they connect together whereby the tether strap becomes an extension of the shoulder straps, the rear end of the tether strap being engagable by an adult for controlling the child while, at the same time, allowing the child sufficient room for moving about.

2. A safety harness as set forth in claim 1 wherein the free ends of the waistband are provided with pieces of fastening material of the hook and loop type and wherein the free ends of the waistband are connected together by a connecting strap having a surface covered by a fastening material of the hook and loop type and wherein the fastening surface of the connecting strap engages the fastening material on the free ends of the waistband.

3. A safety harness as set forth in claim 2 wherein the free ends of the waistband are located at the rear portion thereof and wherein the lower end of the fastening strap is attached to the connecting strap.

4. A safety harness as set forth in claim 1 wherein the rear end of the tether strap is provided with a loop which is engagable by an adult.

5. A safety harness as set forth in claim 1 wherein a locking buckle is slidably and adjustable mounted on the tether strap intermediate the ends thereof and wherein a clasp is mounted on the front portion of the waistband so that, when the child is placed on a seat in a shopping cart, the tether strap can be placed around the seat behind the child, slipped forwardly beneath the seat, and the locking buckle inserted into the clasp such that the locking buckle is retained in the clasp and the child is locked in the seat in the shopping cart.

6. A safety harness as set forth in claim 5 wherein the free ends of the waistband are provided with pieces of fastening material of the hook and loop type and wherein the free ends of the waistband are connected together by a connecting strap having a surface covered by a fastening material of the hook and loop type and wherein the fastening surface of the connecting strap engages the fastening material on the free ends of the waistband.

7. A safety harness as set forth in claim 6 wherein the free ends of the waistband are located at the rear portion thereof and wherein the lower end of the fastening strap is attached to the connecting strap.

* * * * *